(12) United States Patent
Kim et al.

(10) Patent No.: US 8,886,035 B2
(45) Date of Patent: Nov. 11, 2014

(54) OPTICAL LINE TERMINAL IN TIME DIVISION MULTIPLE ACCESS PASSIVE OPTICAL NETWORK AND METHOD FOR PROCESSING OPTICAL SIGNAL THEREOF

(75) Inventors: Jong Deog Kim, Daejeon (KR); Jong Jin Lee, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 164 days.

(21) Appl. No.: 13/590,527

(22) Filed: Aug. 21, 2012

(65) Prior Publication Data
US 2013/0089331 A1    Apr. 11, 2013

(30) Foreign Application Priority Data
Oct. 6, 2011    (KR) ........................ 10-2011-0102033

(51) Int. Cl.
*H04J 14/02* (2006.01)
*G02B 6/42* (2006.01)

(52) U.S. Cl.
CPC ........... *G02B 6/4246* (2013.01); *H04J 14/0252* (2013.01); *H04J 14/0232* (2013.01)
USPC .................. 398/27; 398/72; 398/71; 398/82; 398/35

(58) Field of Classification Search
CPC . H04J 14/0232; H04J 14/0252; G02B 6/4246
USPC .............................................. 398/72; 359/359
See application file for complete search history.

(56) References Cited

U.S. PATENT DOCUMENTS

| 2006/0115271 | A1* | 6/2006 | Hwang et al. .................... 398/72 |
| 2008/0031625 | A1* | 2/2008 | Okuda et al. .................... 398/71 |
| 2008/0131129 | A1* | 6/2008 | Bouda .............................. 398/82 |
| 2009/0317080 | A1* | 12/2009 | Rasztovits-Wiech ........... 398/35 |
| 2011/0091213 | A1 | 4/2011 | Kawaza et al. |

FOREIGN PATENT DOCUMENTS

| JP | 2004-252371 | 9/2004 |
| JP | 2008-42525 | 2/2008 |

* cited by examiner

*Primary Examiner* — David Payne
*Assistant Examiner* — Omar S Ismail
(74) *Attorney, Agent, or Firm* — Nelson Mullins Riley & Scarborough LLP (57) ABSTRACT

Proposed is an efficient method of configuration of a transmitter and a receiver for realizing an optical transmission/reception module apparatus including at least one transmission wavelength and two or more reception wavelengths over a time division multiple access passive optical network or an optical network using multiple transmission/reception wavelengths. Further, proposed is a method of configuration of an apparatus which enables optical alignment and assembly in a single package by using a single lens and three different WDM optical filters for a reception module capable of receiving four wavelengths.

16 Claims, 8 Drawing Sheets

OPTICAL LINE TERMINAL IN TIME DIVISION MULTIPLE ACCESS PASSIVE OPTICAL NETWORK AND METHOD FOR PROCESSING OPTICAL SIGNAL THEREOF

CROSS-REFERENCE TO RELATED APPLICATION

This application claims priority to and the benefit of Korean Patent Application No. 10-2011-0102033 filed in the Korean Intellectual Property Office on Oct. 6, 2011, the entire contents of which are incorporated herein by reference.

BACKGROUND OF THE INVENTION (a) Field of the Invention

The present invention relates to an optical line terminal over a time division multiple access passive optical network and an optical signal processing method therefor.

(b) Description of the Related Art

Recently, a passive optical network (PON) technology has been deployed as an optical subscriber network technology for efficiently providing a variety of multimedia content.

A PON includes a subscriber side optical network unit (ONU) or optical network terminal (ONT), and an optical line terminal OLT for controlling the ONU or ONT. The PON has a Point-to-Multipoint (P2MP) communication structure in which an OLT splits an optical line into a plurality of optical lines by an optical splitter and a plurality of ONUs or ONTs are connected to the split optical lines.

The PON may be classified into a time division multiple access (TDMA)-PON and a wavelength division multiplexing (WDM)-PON according to a transmission scheme of downstream traffic from the OLT and upstream traffic from a subscriber side.

In the TDMA-PON, the OLT broadcasts all downstream traffic to be delivered to the subscriber, but the ONU or ONT transmits upstream traffic only in timeslots allocated to the ONU or ONT by TDMA. Such an upstream traffic transmission scheme is called a burst mode, and burst mode optical traffic transmitted from individual subscribers is different in amplitude and phase. Accordingly, the OLT requires a burst mode receiver capable of receiving burst mode optical traffic that is different in amplitude and phase from individual subscribers and processing it.

The burst mode receiver has a fast response to burst mode optical traffic from individual subscribers and a wide dynamic range, and requires high receiving sensitivity.

Traffic per optical line in the PON has been continuously increasing over the last 10 years. However, a transmission speed increase required for a traffic increase is physically accompanied by a decrease in the receiving sensitivity of the burst mode receiver and the ONU or ONT and an increase in optical line loss. Particularly, the use of a high-speed device at a subscriber's end is a major factor that increases overall network costs, and an increase in the speed of the burst mode receiver at the OLT leads to increased difficulty of technological development and decreased receiving sensitivity, resulting in system performance degradation.

Meanwhile, the PON may be advantageous in the miniaturization and simplification of a system because the number of parts used can be reduced by speeding up in terms of networks and systems. Accordingly, there is a need for a method that is suitable to optimize the economic efficiency and system performance throughout a network, which can minimize costs for a subscriber end, meet the requirements of system miniaturization and performance in the OLT, and minimize technical difficulty.

SUMMARY OF THE INVENTION

The present invention has been made in an effort to provide an optical line terminal over a time division multiple access passive optical network and a receiving apparatus and method thereof, which can minimize costs for a subscriber end, i.e., ONU or ONT, meet the requirements of system miniaturization and performance in the OLT, and minimize technical difficulty.

An exemplary embodiment of the present invention provides an optical line terminal over a time division multiple access passive optical network. The optical line terminal includes a first WDM optical filter and a plurality of second WDM optical filters. The first WDM optical filter reflects upstream traffic optical signals having different wavelengths input from at least one of a plurality of subscriber devices, and transmits downstream traffic optical signals having a single wavelength and outputs the same to the corresponding subscriber device. The plurality of second WDM optical filters split the upstream traffic optical signals reflected by the first WDM optical filter by wavelength and output the same.

The first WDM optical filter and the plurality of second WDM optical filters may be formed as a WDM filter array.

The optical line terminal may further include a plurality of photodiodes for converting the upstream traffic optical signals split by wavelength into electrical signals.

The first WDM optical filter and the plurality of second WDM filters may be optically laminated at regular intervals.

The interval between two neighboring ones of the plurality of photodiodes may be determined depending on the intervals between the first WDM optical filter and the plurality of second WDM optical filters and the slope of the WDM filter array.

The optical line terminal may further include a laser diode for converting electrical signals corresponding to downstream traffic into downstream traffic optical signals, wherein the first WDM optical filter, the plurality of second WDM optical filters, the plurality of photodiodes, and the laser diode may be formed as a module.

The plurality of second WDM optical filters may be formed by performing WDM coating on one side of each of a plurality of glass substrates, and the first WDM optical filter may be formed by performing WDM coating on the opposite side of a glass substrate positioned on an edge, among the plurality of glass substrates.

The optical reflection and transmission characteristics of the first WDM optical filter and the plurality of second WDM optical filters may be determined depending on the corresponding WDM coating properties.

The optical line terminal may further include a lens that converts upstream optical signals from the at least one subscriber device into parallel light and outputs the same to the first WDM optical filter, and converts downstream optical signals from the first WDM optical filter into convergent light and outputs it to the corresponding subscriber device.

The optical line terminal may further include: a lens for converting the upstream traffic optical signals into convergent light and outputting it to the plurality of second WDM optical filters; and a plurality of photodiodes for converting the upstream traffic optical signals split by wavelength into electrical signals, wherein the plurality of second WDM optical filters may be individually aligned within a polyhedron depending on the transmission and reflection characteristics, the lens may be formed on one side of the polyhedron, and the plurality of photodiodes may be respectively formed on the other sides of the polyhedron.

The optical path length from the lens to each photodiode may be equal.

Another embodiment of the present invention provides a method for processing an optical signal in an optical line terminal over a time division multiple access passive optical network. The optical signal processing method for the optical line terminal may include: upon receipt of downstream traffic signals having a single wavelength, transmitting the downstream optical signals and outputting the same to the corresponding subscriber device by means of a first WDM optical filter, among a plurality of WDM optical filters arranged in a laminated manner at regular intervals; upon receipt of upstream traffic optical signals having different wavelengths from at least one of a plurality of subscriber devices, reflecting the upstream traffic optical signals having different wavelengths and splitting the same by wavelength by means of the plurality of WDM optical filters; and converting the upstream traffic optical signals split by wavelength by the plurality of WDM optical filters into respective electrical signals by means of a plurality of photodiodes.

The plurality of WDM optical filters may be formed as a WDM filter array.

The optical signal processing method for the optical line terminal may further include converting the downstream traffic electrical signals into the downstream traffic optical signals and inputting the same to the first WDM optical filter.

The splitting may include transmitting and reflecting optical signals having given wavelengths depending on the optical reflection and transmission characteristics of each of the other WDM optical filters.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

Now, an optical line terminal in a time division multiple access passive optical network and a method for processing an optical signal thereof according to an exemplary embodiment of the present invention will be described in detail with reference to the drawings.

Figure 1:
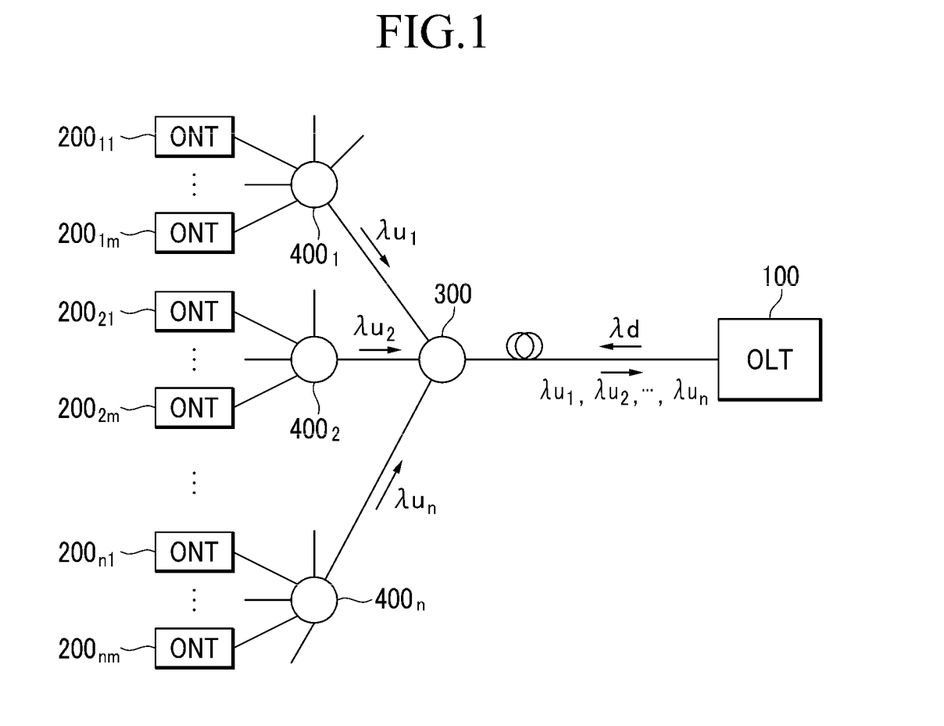
FIG. 1 is a view showing a time division multiple access passive optical network according to an exemplary embodiment of the present invention.

FIG. 1 is a view showing a time division multiple access passive optical network according to an exemplary embodiment of the present invention.

Referring to FIG. 1, the time division multiple access passive optical network includes a network-side optical line termination (OLT) 100, a plurality of subscriber-side optical network terminals (ONT) $200_{11}$-$200_{1m}$, $200_{21}$-$200_{2m}$, ..., $200_{n1}$-$200_{nm}$, and optical splitters 300 and $400_1$-$400_n$.

The OLT 100 and the ONTs $200_{11}$-$200_{1m}$, $200_{21}$-$200_{2m}$, ..., $200_{n1}$-$200_{nm}$ are interconnected by optical lines. The OLT 100 is connected to one end of an optical line. The other end of the optical line is split into n optical lines, and each of the n optical lines is split into m optical lines through the optical splitters $400_1$-$400_N$. That is, the other end of the optical line is split into (n*m) optical lines through the optical splitters 300 and $400_1$-$400_n$, and the ONTs $200_{11}$-$200_{1m}$, $200_{21}$-$200_{2m}$, ..., $200_{n1}$-$200_{nm}$ are respectively connected to the (n*m) split optical lines. The above-mentioned structure in which an OLT is connected to multiple ONTs is referred to as a Point-to-Multipoint (P2MP) structure.

The OLT 100 manages and controls the ONTs $200_{11}$-$200_{1m}$, $200_{21}$-$200_{2m}$, ..., $200_{n1}$-$200_{nm}$.

The OLT 100 allocates a wavelength $\lambda d$ of a single band for downstream traffic transmission of the network and uses the wavelength $\lambda d$ to broadcast downstream traffic.

The OLT 100 allocates a plurality of wavelengths different from the wavelength $\lambda d$ for upstream traffic transmission of a subscriber. Specifically, the OLT 100 may divide the ONTs $200_{11}$-$200_{1m}$, $200_{21}$-$200_{2m}$, ..., $200_{n1}$-$200_{nm}$ managed and controlled by itself into a plurality of groups, e.g., n groups, and allocate different wavelengths $\lambda u_1, \lambda u_2, \ldots, \lambda u_n$ to the n groups. Each group may include m ONTs $200_{11}$-$200_{1m}$/ $200_{21}$-$200_{2m}$/ . . . /$200_{n1}$-$200_{nm}$. Otherwise, the number of ONTs in each group may not be identical.

Moreover, the OLT 100 allocates timeslots for upstream traffic transmission to the ONTs $200_{11}$-$200_{1m}$/$200_{21}$-$200_{2m}$/ . . . /$200_{n1}$-$200_{nm}$ in the same group in a time division multiple access (TDMA) manner because the ONTs $200_{11}$-$200_{1m}$/$200_{21}$-$200_{2m}$/ . . . /$200_{n1}$-$200_{nm}$ use the same wavelength in the same group.

The ONTs $200_{11}$-$200_{1m}$, $200_{21}$-$200_{2m}$, ..., $200_{n1}$-$200_{nm}$ transmit upstream traffic in the allocated timeslots by using the wavelengths $\lambda u_1, \lambda u_2, \ldots, \lambda u_n$ allocated to the respective groups to which they belong. The ONTs $200_{11}$-$200_{1m}$, $200_{21}$-$200_{2m}$, ..., $200_{n1}$-$200_{nm}$ in the same group transmit upstream traffic in the timeslots respectively allocated to them in the TDMA manner. The transmission scheme of upstream traffic transmitted from the ONTs $200_{11}$-$200_{1m}$/$200_{21}$-$200_{2m}$/ . . . /$200_{n1}$-$200_{nm}$ in the same group is called a burst mode, and burst mode upstream traffic transmitted from individual users are different in amplitude and phase.

The optical splitter 300 splits the other end of the optical line connected to the OLT 100 into n, which is the number of groups of ONTs.

The optical splitters $400_1$-$400_n$ each split the optical lines split by the optical splitter 300 into m or more, which is the number of ONTs in a group.

As such, the time division multiple access passive optical network according to an exemplary embodiment of the present invention has a mixed structure of the TDMA scheme and the wavelength division multiplexing (WDM) scheme. That is, n groups use n different wavelengths $\lambda u_1, \lambda u_2, \ldots, \lambda u_n$ by the WDM scheme, and the ONTs, for example, ONTs $200_{11}$-$200_{1m}$, in the same group transmit upstream traffic in the timeslots respectively allocated to them in the TDMA scheme by using the allocated wavelength $\lambda u_1$.

A typical time division multiple access passive optical network is allocated with respective wavelengths for upstream and downstream traffic transmission, and supports the symmetrical or asymmetrical transmission speed of upstream traffic or downstream traffic. In an example of asymmetrical transmission speed, a transmission speed of 10 Gbps is supported for upstream traffic, whereas a transmission speed of 2.5 Gbps, which is lower than the transmission speed of upstream traffic, is supported for downstream traffic. In an example of symmetrical transmission speed, a transmission speed of 10 Gbps is supported for both upstream and downstream traffic.

On the other hand, the time division multiple access passive optical network shown in FIG. 1 can provide an overall symmetrical transmission speed of upstream traffic and downstream traffic even if an asymmetrical transmission speed is supported for respective wavelengths for upstream traffic and downstream traffic. For example, if n is 4, the overall transmission speed of upstream traffic is equal to 10 Gbps [=2.5*n=4] even if a transmission speed of 2.5 Gbps is supported for respective wavelengths of downstream traffic. That is, the sum of transmission speeds of upstream traffic and the transmission speed of downstream traffic are 10 Gbps, which is a symmetrical transmission speed.

A network that provides an overall symmetrical transmission speed of upstream traffic and downstream traffic has the merit of minimizing additional costs and increasing the overall transmission speed of upstream traffic by using low-speed optical transmission/reception parts that were commercialized and developed conventionally.

Figure 2:
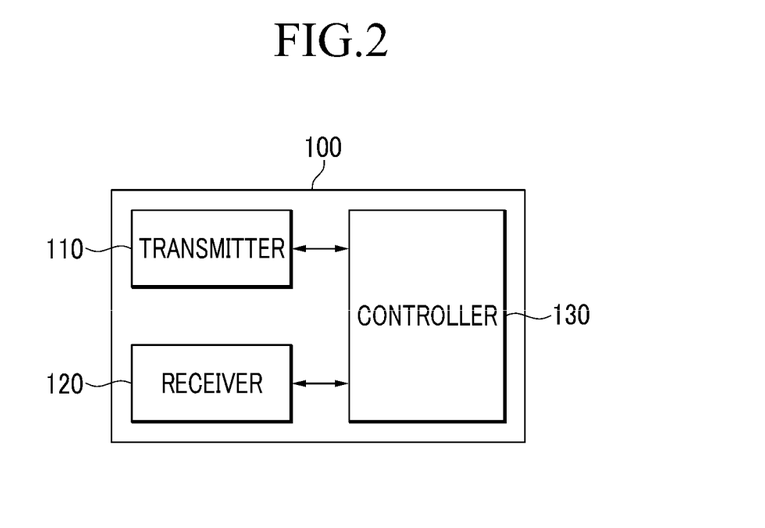
FIG. 2 is a view illustrating the OLT shown in FIG. 1.

FIG. 2 is a view illustrating the OLT shown in FIG. 1.

Referring to FIG. 2, the OLT 100 includes a transmitter 110, a receiver 120, and a controller 130.

First, if a single-wavelength light source is used for the ONTs $200_{11}$-$200_{1m}$, $200_{21}$-$200_{2m}$, $\ldots$, $200_{n1}$-$200_{nm}$, the ONTs $200_{11}$-$200_{1m}$, $200_{21}$-$200_{2m}$, $\ldots$, $200_{n1}$-$200_{nm}$ may be disposed and managed at the time of network configuration so that different wavelengths $\lambda u_1, \lambda u_2, \ldots, \lambda u_n$ are used for the respective groups.

On the other hand, if a variable-wavelength light source is used for the ONTs $200_{11}$-$200_{1m}$, $200_{21}$-$200_{2m}$, $\ldots$, $200_{n1}$-$200_{nm}$, the controller 130 allocates wavelengths that the ONTs $200_{11}$-$200_{1m}$, $200_{21}$-$200_{2m}$, $\ldots$, $200_{n1}$-$200_{nm}$ managed by the OLT 100 will use for upstream traffic transmission. The controller 130 may divide the ONTs $200_{11}$-$200_{1m}$, $200_{21}$-$200_{2m}$, $\ldots$, $200_{n1}$-$200_{nm}$ into a plurality of groups and allocate different wavelengths $\lambda u_1, \lambda u_2, \ldots, \lambda u_n$ to the respective groups. For example, the controller 130 may allocate the wavelength $\lambda u_1$ to the group to which the ONTs $200_{11}$-$200_{1m}$ belong and the wavelength $\lambda u_2$ to the group to which the ONTs $200_{21}$-$200_{2m}$.

In this way, the ONTs $200_{11}$-$200_{1m}/200_{21}$-$200_{2m}/\ldots/200_{n1}$-$200_{nm}$ of the same group use the same wavelength, and hence a friction may occur when the OLT 100 receives upstream traffic sent from the ONTs $200_{11}$-$200_{1m}/200_{21}$-$200_{2m}/\ldots/200_{n1}$-$200_{nm}$. Accordingly, the controller 130 may allocate timeslots for upstream traffic transmission to the ONTs $200_{11}$-$200_{1m}/200_{21}$-$200_{2m}/\ldots/200_{n1}$-$200_{nm}$ in the same group by the TDMA manner.

The controller 130 uses a single wavelength $\lambda d$ for downstream traffic transmission, which is in a different range from the wavelength for upstream traffic. The single wavelength $\lambda d$ to be used for downstream traffic transmission may be selected by a user in advance.

Moreover, the controller 130 serves to control upstream and downstream traffic transmission of the transmitter 110 and receiver 120.

Next, the transmitter 110 uses the allocated wavelength to broadcast downstream traffic.

The receiver 120 receives burst mode upstream traffic from at least one of the ONTs $200_{11}$-$200_{1m}$, $200_{21}$-$200_{2m}$, $\ldots$, $200_{n1}$-$200_{nm}$ and processes it. That is, the receiver 120 receives burst mode upstream traffic having a different phase and amplitude according to the wavelengths $\lambda u_1, \lambda u_2, \ldots, \lambda u_n$ and detects the corresponding upstream traffic. The receiver 120 of this type may be a burst mode receiver that receives and processes burst mode upstream traffic.

Figure 3:
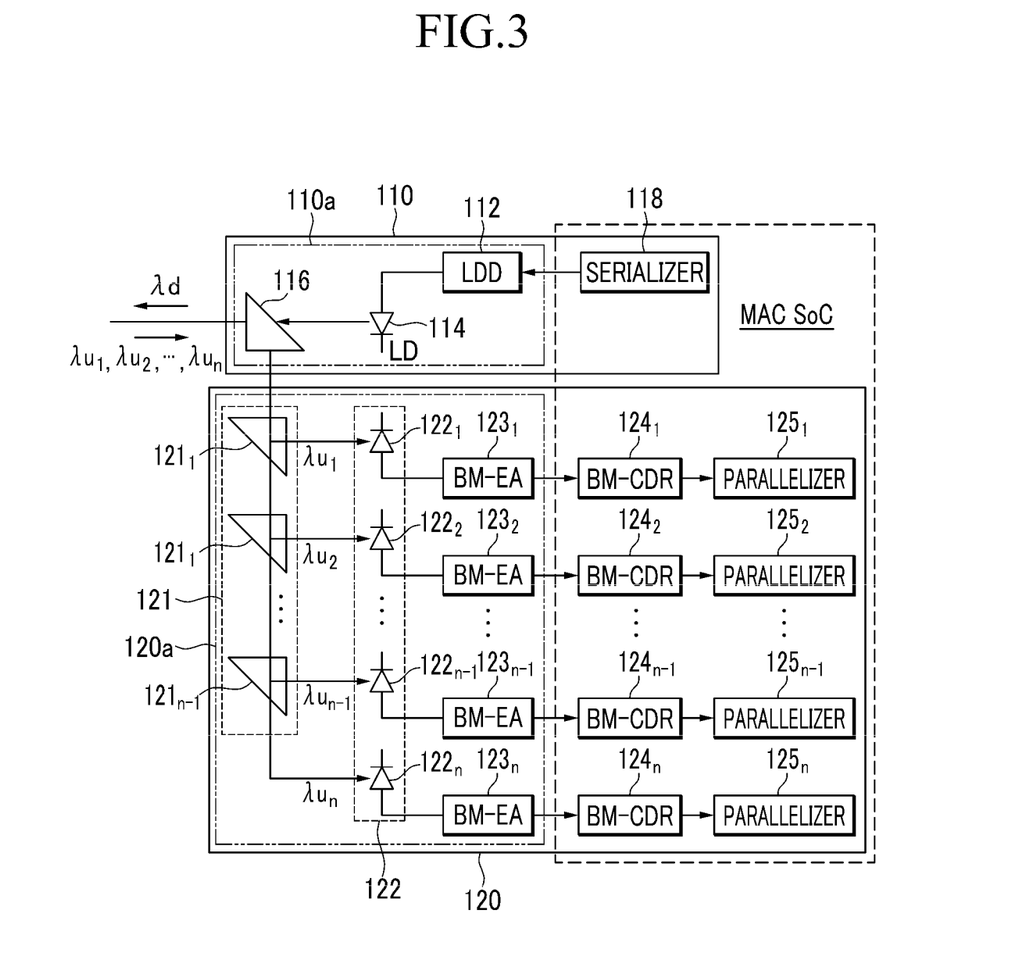
FIG. 3 is a view illustrating the transmitter and receiver shown in FIG. 2 in detail.
Figure 4:
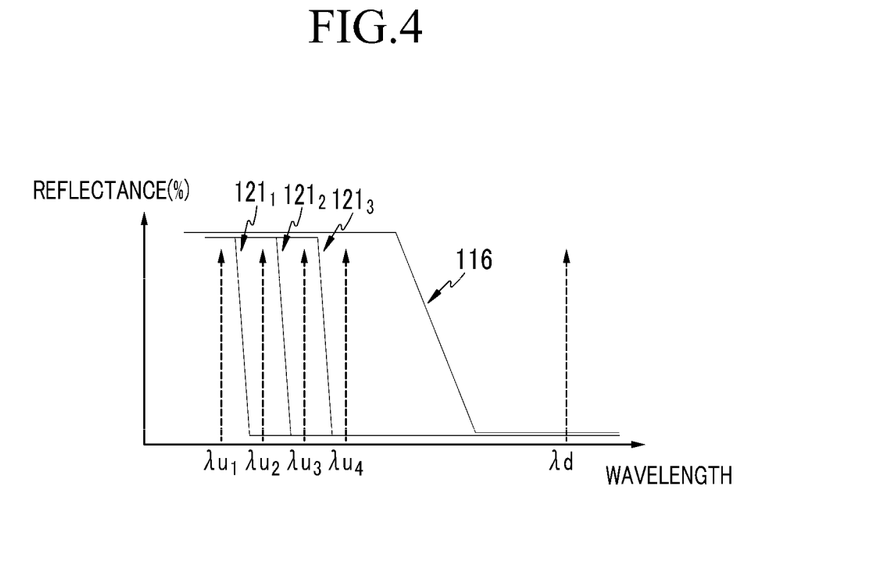
FIG. 4 is a view illustrating an example of the optical transmission and reflection characteristics of each WDM optical filter shown in FIG. 3.

FIG. 3 is a view illustrating the transmitter and receiver shown in FIG. 2 in detail, and FIG. 4 is a view illustrating an example of the optical transmission and reflection characteristics of each WDM optical filter shown in FIG. 3.

Referring to FIG. 3, the transmitter 110 may include a transmitted light processor 110a.

The transmitted light processor 110a may include a laser diode driver (LDD) 112, a laser diode (LD) unit 114, and a WDM optical filter 116.

The LDD 112 controls the LD unit 114. The LDD 112 receives electrical signals corresponding to downstream traffic from the network, and outputs them to the LD unit 114 in response to a selection signal (not shown).

The LD unit 114 converts the electrical signals into optical signals having a predetermined wavelength under the control of the LDD 112. The LD unit 114 may include an LD (127 of FIG. 6) and a lens (128 of FIG. 6) for focusing light output from the LD, for example.

The WDM optical filter 116 transmits optical signals having the wavelength $\lambda d$ from the LD unit 114 so as to output downstream traffic optical signals to be broadcasted to the ONTs. Moreover, the WDM optical filter 116 reflects input optical signals having wavelengths $\lambda u_1, \lambda u_2, \ldots, \lambda u_n$ including upstream traffic from the ONTs $200_{11}$-$200_{1m}$, $200_{21}$-$200_{2m}$, $\ldots$, $200_{n1}$-$200_{nm}$.

The transmitter 110 may further include a serializer 118.

The serializer 118 serves to convert parallel downstream traffic to be transmitted to two or more ONTs into serial downstream traffic and outputs it to the LDD 112.

Next, the receiver 120 may include a received light processor 120a.

The received light processor 120a may include a plurality of WDM optical filters, e.g., WDM optical filters $121_1, \ldots, 121_{n-1}$, a plurality of photodiodes, e.g., n PDs $122_1, \ldots, 122_n$, and a plurality of burst mode electrical amplifiers (BM-EA), e.g., n BM-EAs $123_1, \ldots, 123_n$.

The WDM optical filter 116 of the transmitted light processor 110 and the WDM optical filters $121_1, \ldots, 121_{n-1}$ of the received light processor 120a may be implemented as a WDM filter array 121, and the PDs $122_1, \ldots, 122_n$ may be implemented as a PD array 122.

The WDM optical filter 116 reflects input optical signals having wavelengths $\lambda u_1, \lambda u_2, \ldots, \lambda u_n$ including upstream traffic from the ONTs $200_{11}$-$200_{1m}$, $200_{21}$-$200_{2m}$, $\ldots$, $200_{n1}$-$200_{nm}$ so that the input optical signals are input into the WDM optical filters $121_1, \ldots, 121_{n-1}$.

The WDM filter array 121 splits the wavelengths $\lambda u_1$, $\lambda u_2, \ldots, \lambda u_n$ of the incoming upstream traffic by wavelength. That is, depending on the optical transmission and reflection characteristics of the WDM optical filters $121_1, \ldots, 121_{n-1}$, optical signals of a certain wavelength are transmitted, and optical signals of another certain wavelength are reflected. As a result, the optical signals are split by wavelengths $\lambda u_1$, $\lambda u_2, \ldots, \lambda u_n$.

For example, if n is 4, 4 WDM optical filters 116, $121_1$, $121_2$, $121_3$ may be implemented to have the optical transmission and reflection characteristics shown in FIG. 4.

FIG. 4 illustrates the optical transmission and reflection characteristics of edge type WDM optical filters 116, $121_1$, $121_2$, and $121_3$.

First, the WDM optical filter 116 reflects a short wavelength region and transmits a long wavelength region, with respect to an edge wavelength region between the wavelength $\lambda d$ and the wavelength $\lambda u_4$. That is, a region including the wavelength $\lambda d$ is transmitted, and a region including the wavelengths $\lambda u_1$, $\lambda u_2$, $\lambda u_3$, and $\lambda u_4$ is reflected.

If 3 WDM optical filters $121_1$, $121_2$, and $121_3$ have the optical transmission and reflection characteristics shown in FIG. 4, the WDM optical filter $121_1$ reflects optical signals having the wavelength $\lambda u_1$, and transmits optical signals having the wavelengths $\lambda u_2$, $\lambda u_3$ and $\lambda u_4$ which are longer than the wavelength $\lambda u_1$. The WDM optical filter $121_2$ reflects optical signals having the wavelengths $\lambda u_1$ and $\lambda u_2$ and transmits optical signals having the wavelengths $\lambda u_3$ and $\lambda u_4$. The WDM optical filter $121_3$ reflects optical signals having the wavelengths $\lambda u_1$, $\lambda u_2$, and $\lambda u_3$ which are shorter than the wavelength $\lambda u_3$, and transmits optical signals having the wavelength $\lambda u_4$.

Using the optical transmission and reflection characteristics of the WDM optical filters 116, $121_1$, $121_2$, and $121_3$, optical signals can be split by wavelengths $\lambda u_1$, $\lambda u_2$, $\lambda u_3$ and $\lambda u_4$. Moreover, even when WDM optical filters having reverse transmission and reflection characteristics are used, the same effect can be attained by changing the configuration of the transmitter 110 and the receiver 120.

Referring again to FIG. 3, the PDs $122_1, \ldots, 122_n$ of the PD array 122 convert optical signals having the corresponding wavelengths $u_1, \lambda u_2, \ldots, \lambda u_n$ into electrical signals.

The BM-EAs $123_1, \ldots, 123_n$ amplify the electrical signals converted by the corresponding PDs $122_1, \ldots, 122_n$ into digital signals of a certain amplitude.

The receiver 120 may further include n burst mode clock and data recovery units (BM-CDR) $124_1, \ldots, 124_n$ and n parallelizers $125_1, \ldots, 125_n$.

The BM-CDRs $124_1, \ldots, 124_n$ serve to match the phase of the signals amplified by the BM-EAs $123_1, \ldots, 123_n$ and the phase of a reference block.

The parallelizers $125_1, \ldots, 125_n$ convert output signals of the BM-CDRs $124_1, \ldots, 124_n$ into parallel signals so as to correspond to each OLT.

The serializer 118 of the transmitter 11 and the BM-CDRs $124_1, \ldots, 124_n$ and parallelizers $125_1, \ldots, 125_n$ of the receiver 120 may be efficiently integrated in a system on chip (SOC) for a media access controller (MAC).

The receiver 120 is a multichannel optical receiver consisting of (n-1) WDM filters $121_1, \ldots, 121_{n-1}$, n PDs $122_1, \ldots, 122_n$, and n BM-ERs $123_1, \ldots, 123_n$, which requires a packaging technology for miniaturization and integration. For the sake of simplification of description, the following description will be made on the assumption that n is 4.

Figure 5:
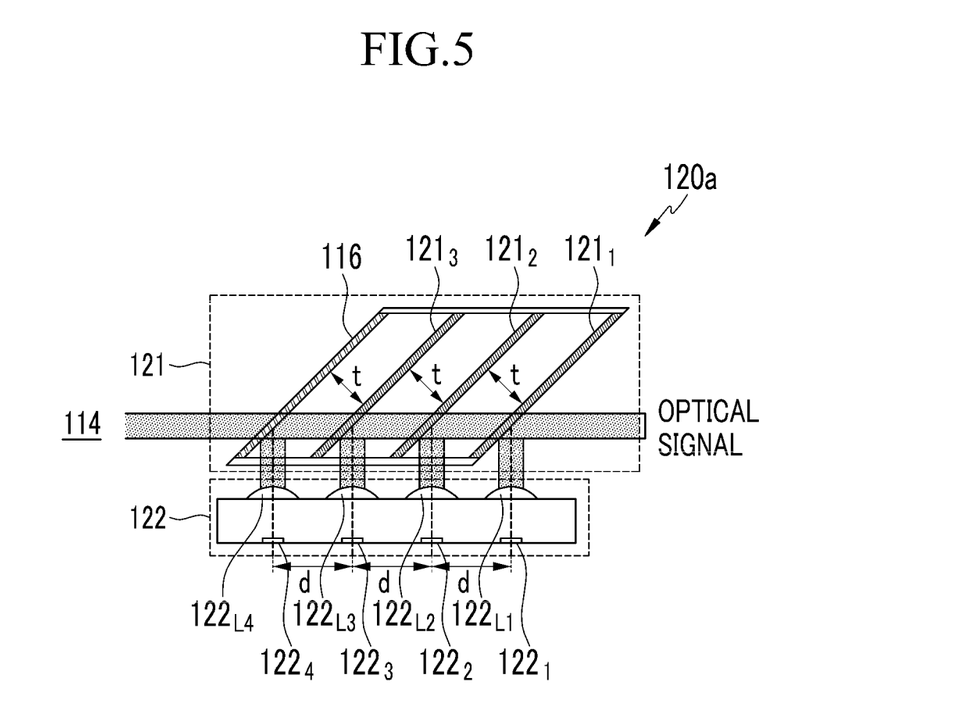
FIG. 5 is a view illustrating an example of the transmitted light processor and received light processor shown in FIG. 3.

FIG. 5 is a view illustrating an example in which the transmitted light processor and received light processor shown in FIG. 3 are simultaneously and efficiently implemented.

Referring to FIG. 5, the WDM filter array 121 may include WDM optical filters $121_1$, $121_2$, $121_3$, and 116.

The WDM optical filters $121_1$, $121_2$, $121_3$, and 116 are laminated, and the WDM optical filters $121_1$, $121_2$, $121_3$, and 116 are optically spaced apart at regular intervals. Particularly, in the case of the WDM filter array 121 which is used at an angle of 45 degrees, the intervals t between the WDM optical filters $121_1$, $121_2$, $121_3$, and 116 and the distances d between the neighboring PDs of the PD array 122 have the relationship shown in Equation 1.

$$\text{Distance}(d) = \text{interval}(t) * \cot 45° \qquad \text{[Equation 1]}$$

where * denotes multiplication, and cot denotes a cotangent.

The WDM optical filters $121_1$, $121_2$, $121_3$, and 116 transmit and vertically reflect optical signals having corresponding wavelengths, depending on their optical transmission and reflection characteristics of the optical signals having the wavelengths received.

The WDM optical filters $121_1$, $121_2$, $121_3$, and 116 are characterized in that they transmit a transmission wavelength $\lambda d$ from the LD 144.

Upstream traffic optical signals including four wavelengths $\lambda u_1, \lambda u_2, \lambda u_3$, and $\lambda u_4$ are input into the WDM optical filter array 121, and the upstream traffic optical signals including four wavelengths $\lambda u_1$, $\lambda u_2$, $\lambda u_3$, and $\lambda u_4$ pass through the WDM optical filters $121_1$, $121_2$, $121_3$, and 116 and are split and output into optical signals having the four wavelengths $\lambda u_1, \lambda u_2, \lambda u_3$, and $\lambda u_4$ so as to correspond to the regular intervals d between the PDs $122_1$, $122_2$, $122_3$, and $122_4$ of the PD array 122 of FIG. 5 as in Equation 1.

The four PDs $122_1$, $122_2$, $122_3$, and $122_4$ of the PD array 122 correspond to the positions at which the upstream traffic optical signals are split into the optical signals having the four wavelengths $\lambda u_1, \lambda u_2, \lambda u_3$, and $\lambda u_4$ and output by the WDM filter array 121.

The PD array 122 may further include a lens array including a plurality of lenses $122_{L1}$, $122_{L2}$, $122_{L3}$, and $122_{L4}$ for collecting the optical signals having the four wavelengths $\lambda u_1, \lambda u_2, \lambda u_3$, and $\lambda u_4$ split by the WDM filter array 12 and delivering them to the corresponding PDS $122_1$, $122_2$, $122_3$, and $122_4$.

Figure 6:
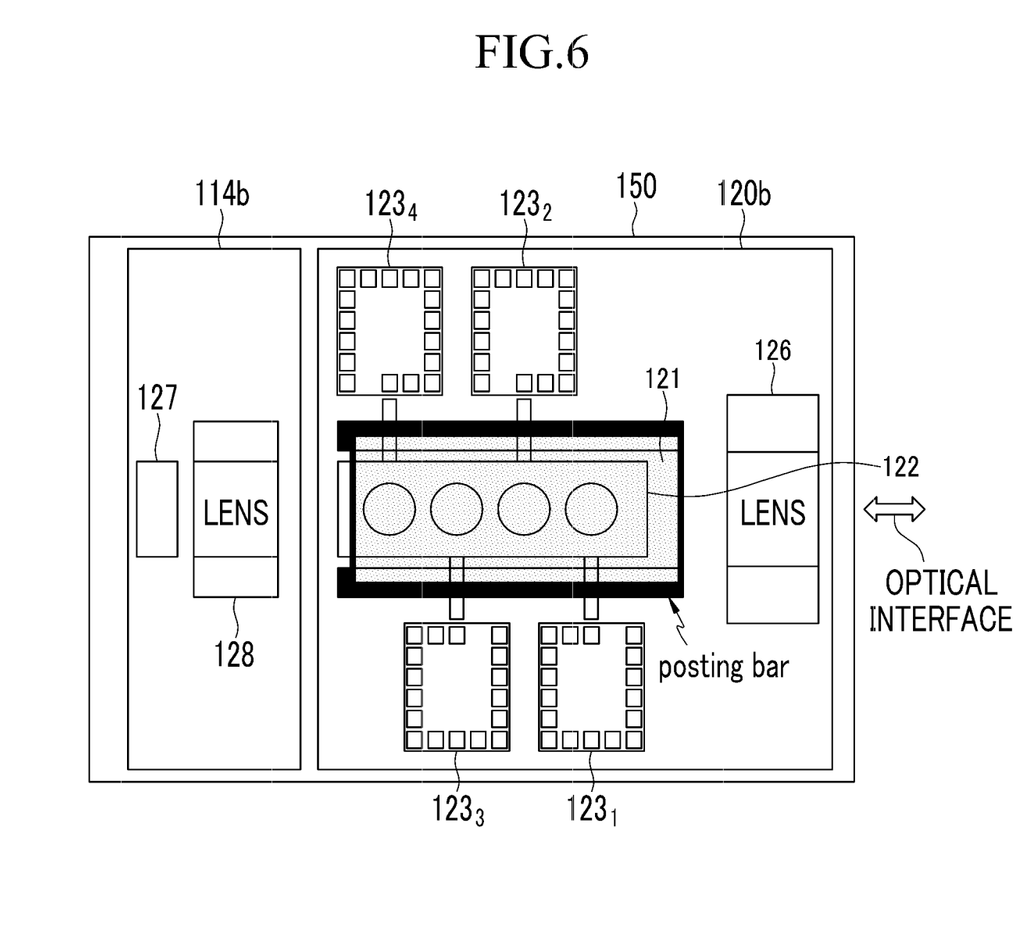
FIG. 6 is a view illustrating the configuration structure of the received light processor shown in FIG. 5.

FIG. 6 is a view illustrating an assembly structure in which the transmission and received light processors shown in FIG. 5 are arranged as a single transmission/reception module.

Referring to FIG. 6, the PD array 122 including the PDs $122_1$, $122_2$, $122_3$, and $122_4$ and the lens $122_{L1}$, $122_{L2}$, $122_{L3}$, and $122_{L4}$ are mounted on a platform 120b. Metal patterns are formed on the platform 120b, and the BM-EAs $123_1$, $123_2$, $123_3$, and $123_4$ are mounted on the respective metal patterns. The BM-EAs $123_1$, $123_2$, $123_3$, and $123_4$ may be electrically connected to the corresponding PDs $122_1$, $122_2$, $122_3$, and $122_4$ via the respective metal patterns and an electrical interface such as wire bonding (not shown in detail in FIG. 6).

The WDM filter array 121 is positioned on the PD array 122. A posting bar may be provided in order to position the WDM filter array 121 on the PD array 122, and the WDM filter array 121 may be mounted on the posting bar.

Moreover, the LD 127 and lens 128 of the LD unit 114 are mounted on the platform 114b and disposed such that they are positioned on the opposite side of an optical interface with respect to the platform 120b within the transmission/reception module 150, and a transmitted optical signal of the wavelength $\lambda d$ from the LD 127 is transmitted through the WDM filter array 121 and optically aligned with the optical interface by the lens 126. The optical interface may be an optical fiber, for example.

Furthermore, received optical signals including the fourth wavelengths $\lambda u_1$, $\lambda u_2$, $\lambda u_3$, and $\lambda u_4$ input via the optical interface are converted into parallel light by the lens 126 and split and output through the WDM filter array 121 and enter the PDs 122₁, 122₂, 122₃, and 122₄. In addition, downstream traffic optical signals may be converted into convergent light by the lens 126 and transmitted to the corresponding subscriber device.

Next, a method for manufacturing the WDM filter array 121 according to an exemplary embodiment of the present invention will be described with reference to FIGS. 7A to 7H.

FIGS. 7A to 7H are views illustrating a method for manufacturing the WDM filter array shown in FIG. 5.

Figure 7A:
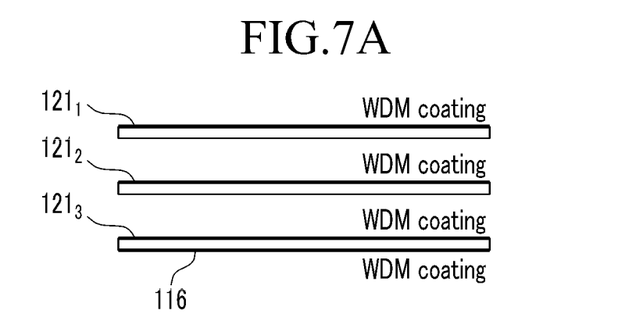
FIGS. 7A to 7H are views illustrating a method for manufacturing the WDM filter array shown in FIG. 5.

Referring to FIG. 7A, a WDM coating treatment is performed on one side or both sides of three glass substrates to form WDM optical filters 121₁, 121₂, 121₃, and 116 that are suitable for respective split wavelengths. Depending on coating characteristics, a specific wavelength is transmitted and another specific wavelength is reflected. Particularly, the last one of the three glass substrates has a WDM coating on both sides. The thickness of each glass substrate may be determined such that the WDM optical filters 121₁, 121₂, 121₃, and 116 have the same optical path length including the WDM coating.

Figure 7B:
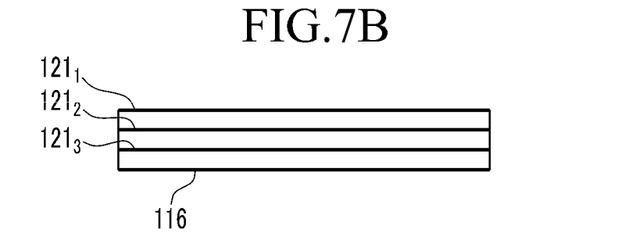

Referring to FIG. 7B, the WDM optical filters 121₁, 121₂, 121₃, and 116 are sequentially laminated and bonded together to form a WDM filter array circular plate.

Figure 7C:
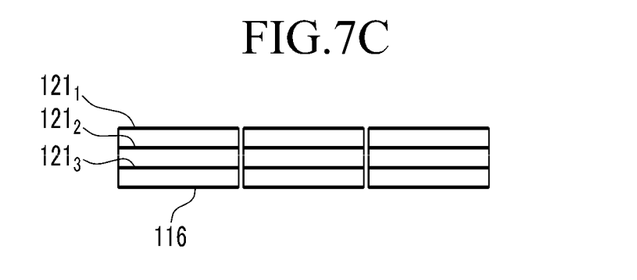

Next, referring to FIG. 7C, the WDM filter array prototype is cut to an appropriate length.

Figure 7D:
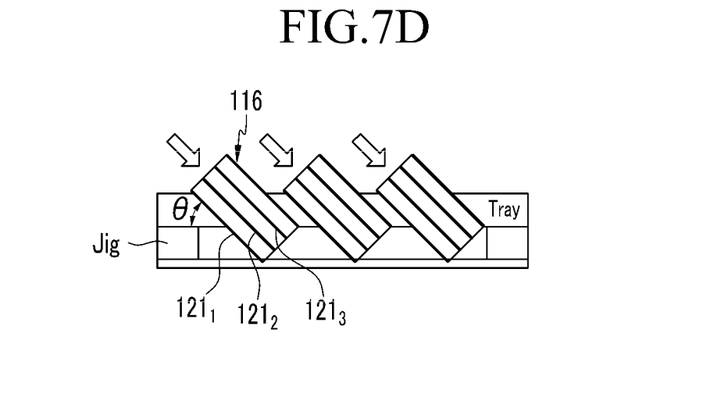

Next, referring to FIG. 7D, the cut WDM filter array circular plates are assembled to a tray having a given thickness by using a jig so that they have a predetermined slope θ, e.g., 45 degrees, and their corner portions are exposed to both sides.

Figure 7E:
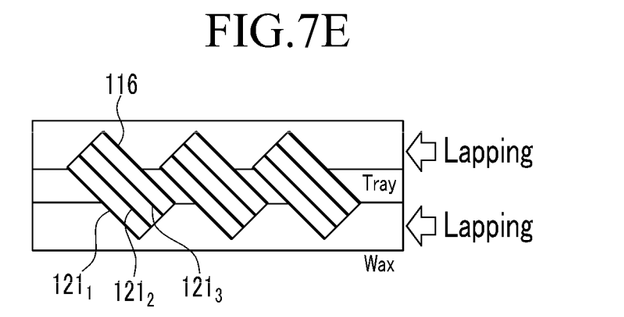

Referring to FIG. 7E, a solid material such as wax or paraffin is applied to both sides of the tray, to which the cut WDM filter array prototypes are assembled, and hardened to fix and attach the WDM filter arrays assembled to the tray.

Next, both sides of the assembled WDM filter arrays are lapped. Then, as shown in FIG. 7F, only the portions of the WDM optical filters 121₁, 121₂, 121₃, and 116 corresponding to the thickness of the tray are left.

Figure 7F:
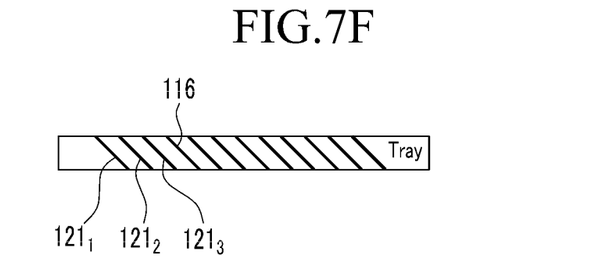

Next, also referring to FIG. 7F, the lapped surface is polished so as to have a surface roughness for optical coating.

Figure 7G:
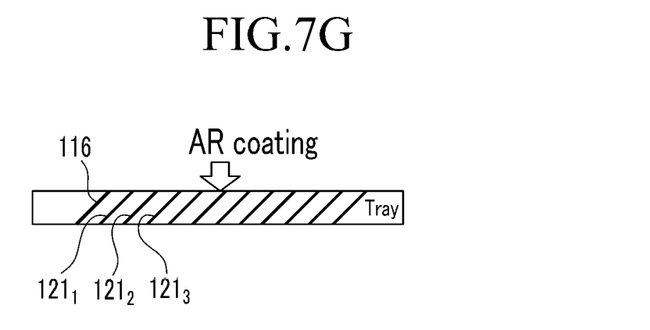

Subsequently, referring to FIG. 7G, anti-reflective coating is performed on one side or both sides of the lapped surface.

Figure 7H:
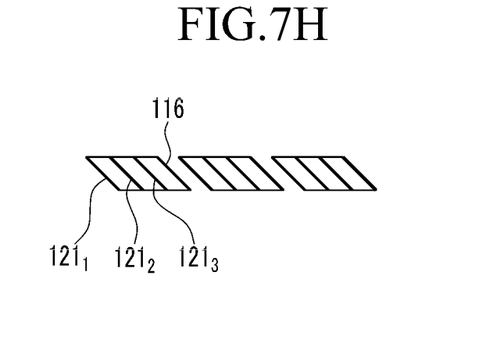

Finally, referring to FIG. 7H, the WDM filter arrays are removed from the tray and cleaned. In this way, the WDM filter arrays are completed. One of the three WDM filter arrays shown in FIG. 7H may be the WDM filter array 121.

Additionally, in order to prevent damage to the thin-film coating caused by contact between the WDM coating surface and the tray of FIG. 7D, a protective film or register film may be formed on both lower and upper sides in the state of FIG. 7B or FIG. 7C before assembling as shown in FIG. 7D.

Figure 8:
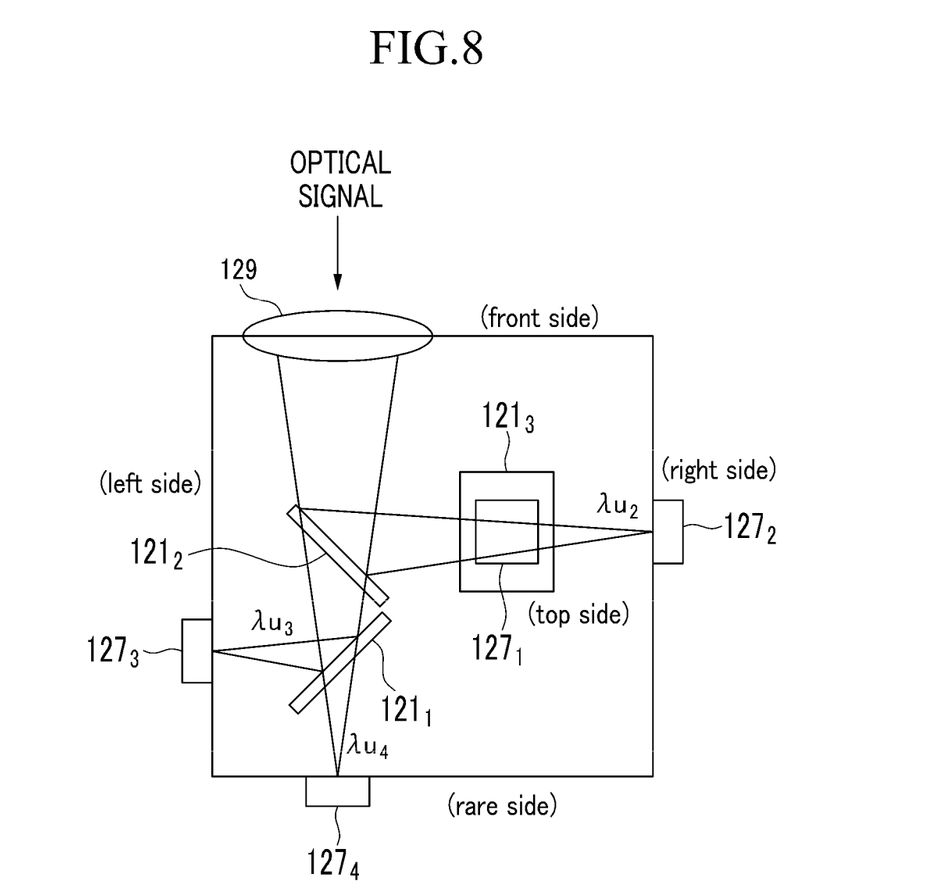
FIG. 8 is a top plan view illustrating another example of the received light processor according to an exemplary embodiment of the present invention.

FIG. 8 is a top plan view illustrating an example for assembling the received light processor 120a' as a module by using the respective WDM optical filters according to an exemplary embodiment of the present invention. Referring to FIG. 8, the received light processor 120a' has a structure that splits upstream traffic optical signals incident through a lens 129 into four wavelengths $\lambda u_1$, $\lambda u_2$, $\lambda u_3$, and $\lambda u_4$ by two steps of wavelength multiplexing through the WDM optical filters 121₁, 121₂, and 121₃. The upstream traffic optical signals may be input into the lens 129 through the WDM optical filter 116 or may be directly input into the lens 120 through an optical line. The lens 129 converts the input upstream traffic optical signals into convergent light and outputs it.

In an example of this structure, in the case of input of optical signals having the fourth wavelengths $\lambda u_1$, $\lambda u_2$, $\lambda u_3$, and $\lambda u_4$, the WDM optical filters 121₁, 121₂, and 121₃ and receiver sub-modules 127₁, 127₂, 127₃, and 127₄ may be disposed in a space as shown in FIG. 8. The receiver sub-modules 127₁, 127₂, 127₃, and 127₄ each include a corresponding PD and a corresponding BM-EA, and may be disposed on four difference sides of a hexahedral package.

That is, the WDM optical filter 121₂ receives the optical signals having the four wavelengths $\lambda u_1$, $\lambda u_2$, $\lambda u_3$, and $\lambda u_4$, and reflects the optical signals having the two wavelengths $\lambda u_1$ and $\lambda u_2$ and transmits the optical signals having the two wavelengths $\lambda u_3$ and $\lambda u_4$.

The optical signals having the two wavelengths $\lambda u_1$ and $\lambda u_2$ reflected by the WDM optical filter 121₁ enter the WDM optical filters 121₁, and the WDM optical filter 121₁ reflects the optical signals of one wavelength $\lambda u_1$ among the optical signals having the two wavelength $\lambda u_1$ and $\lambda u_2$, and transmits the optical signals having the other wavelength $\lambda u_2$. The optical signals having the wavelength $\lambda u_1$ reflected by the WDM optical filter 121₁ enter the receiver sub-module 127₁, and the wavelength $\lambda u_2$ transmitted by the WDM optical filter 121₁ enters the receiver sub-module 127₂.

The optical signals having the two wavelengths $\lambda u_3$ and $\lambda u_4$ transmitted by the WDM optical filter 121₂ enter the WDM optical filters 121₃, and the WDM optical filter 121₃ reflects the optical signals having one wavelength $\lambda u_3$ among the optical signals having the two wavelength $\lambda u_3$ and $\lambda u_4$, and transmits the optical signals having the other wavelength $\lambda u_4$. The optical signals having the wavelength $\lambda u_3$ reflected by the WDM optical filter 121₃ enter the receiver sub-module 127₃, and the wavelength $\lambda u_4$ transmitted by the WDM optical filter 121₃ enters the receiver sub-module 127₄.

The above-described configuration enables the use of a conventional WDM optical filter, such as a thin film filter, with guaranteed excellence, and allows the optical path length from a lens to the receiver sub-modules 127₁, 127₂, 127₃, and 127₄ to be kept equal, whereby the receiver sub-modules 127₁, 127₂, 127₃, and 127₄ for receiving individual wavelengths can attain the same optical alignment and coupling efficiency.

Particularly, the receiver sub-modules 127₁, 127₂, 127₃, and 127₄ receiving individual wavelengths each include a PD and a BM-EA within a conventionally and widely used, inexpensive TO-package. The receiver sub-modules 127₁, 127₂, 127₃, and 127₄ may be sequentially assembled by active optical alignment in a package with six sides, such as a hexahedron including a lens 126 on one side and optical glass windows on four sides.

The above-described transmitted light processor 110a and received light processors 120a and 120a' may have varied configurations depending on the combination of the optical transmission and reflection characteristics of the WDM filters 121₁, 121₂, 121₃, and 116. The WDM filters 121₁, 121₂, 121₃, and 116 may be of a band-pass filter type for transmitting or reflecting only a specific wavelength or reflecting or transmitting a short or long wavelength region, rather than the above-mentioned edge type. In this case as well, the methods proposed in the present invention are applicable to such an extent that changes of the configuration order of the parts corresponding to individual wavelengths can be made.

According to an exemplary embodiment of the present invention, it is possible to configure a symmetrical PON, which uses a relatively low upstream transmission speed compared to a downstream transmission speed for an optical line and renders overall upstream and downstream traffic the same, because multiple wavelengths, rather than a single wavelength, are used for upstream traffic transmission between an OLT and an ONU/ONT, as in the conventional art.

Moreover, an inexpensive ONU/ONT optical transmission/reception module having high transmission output power can be used because the ONU/ONT uses a transmitter having a low transmission speed, and power budget performance versus upstream traffic can be improved since the OLT keeps the receiving sensitivity of a burst mode receiver relatively high. Therefore, network coverage, i.e., the number of subscribers (ONUs/ONTs) and the transmission distance, can be enhanced. Accordingly, a P2MP subscriber network with higher economic efficiency can be configured by employing a transmitter and a receiver that are used one generation ahead or ones with equivalent performance to enable the configuration of optical lines in a next-generation network.

Furthermore, the number of ONTs per OLT line within the same distance can be increased, or the transmission distance for the same number of ONTs can be increased. Particularly, the increase in the number of ONTs per line and the use of an optical transmitter with relatively low specifications at the ONTs allow the configuration of a network with improved economic efficiency. In addition, the use of a WDM filter array makes it possible to manufacture a small-sized multi-channel receiver for an OLT.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical line terminal in a time division multiple access passive optical network, the optical line terminal comprising:
    a first WDM optical filter that reflects upstream traffic optical signals having different wavelengths input from at least one of a plurality of subscriber devices, and transmits downstream traffic optical signals having a single wavelength and outputs the same to the corresponding subscriber device; and
    a plurality of second WDM optical filters that split the upstream traffic optical signals reflected by the first WDM optical filter by wavelength and output the same, and wherein the first WDM optical filter and the plurality of second WDM filters are optically laminated at regular intervals, and an interval between two neighboring photodiodes of a plurality of photodiodes is determined depending on the intervals between the first WDM optical filter and the plurality of second WDM optical filters and a slope of a WDM filter array.

2. The optical line terminal of claim 1, wherein the first WDM optical filter and the plurality of second WDM optical filters are formed as the WDM filter array.

3. The optical line terminal of claim 2, further comprising the plurality of photodiodes for converting the upstream traffic optical signals split by wavelength into electrical signals.

4. The optical line terminal of claim 3, further comprising a laser diode for converting electrical signals corresponding to downstream traffic into downstream traffic optical signals, wherein the first WDM optical filter, the plurality of second WDM optical filters, the plurality of photodiodes, and the laser diode are formed as a module.

5. The optical line terminal of claim 2, wherein the plurality of second WDM optical filters are formed by performing WDM coating on one side of each of a plurality of glass substrates, and the first WDM optical filter is formed by performing WDM coating on the opposite side of a glass substrate positioned on an edge, among the plurality of glass substrates.

6. The optical line terminal of claim 5, wherein the optical reflection and transmission characteristics of the first WDM optical filter and the plurality of second WDM optical filters are determined depending on the corresponding WDM coating properties.

7. The optical line terminal of claim 3, further comprising a plurality of burst mode electric amplifiers for amplifying a plurality of electrical signals converted by the plurality of photodiodes into signals of a given length.

8. The optical line terminal of claim 1, further comprising a lens that converts upstream optical signals from the at least one subscriber device into parallel light and outputs the same to the first WDM optical filter, and converts downstream optical signals from the first WDM optical filter into convergent light and outputs it to the corresponding subscriber device.

9. An optical line terminal in a time division multiple access passive optical network, the optical line terminal comprising:
    a first WDM optical filter that reflects upstream traffic optical signals having different wavelengths input from at least one of a plurality of subscriber devices, and transmits downstream traffic optical signals having a single wavelength and outputs the same to the corresponding subscriber device;
    a plurality of second WDM optical filters that split the upstream traffic optical signals reflected by the first WDM optical filter by wavelength and output the same, and wherein the first WDM optical filter and the plurality of second WDM filters are optically laminated at regular intervals, and an interval between two neighboring photodiodes of a plurality of photodiodes is determined depending on the intervals between the first WDM optical filter and the plurality of second WDM optical filters and a slope of a WDM filter array;
    a lens for converting the upstream traffic optical signals into convergent light and outputting it to the plurality of second WDM optical filters; and
    a plurality of photodiodes for converting the upstream traffic optical signals split by wavelength into electrical signals, wherein the plurality of second WDM optical filters are individually aligned within a polyhedron depending on the transmission and reflection characteristics, the lens is formed on one side of the polyhedron, and the plurality of photodiodes are respectively formed on the other sides of the polyhedron.

10. The optical line terminal of claim 9, wherein the optical path length from the lens to each photodiode is equal.

11. The optical line terminal of claim 1, wherein the plurality of subscriber devices are divided into a plurality of groups, different wavelengths are allocated to the respective groups, and different timeslots are allocated to subscriber devices of the same group.

12. An optical signal processing method for an optical line terminal, the method comprising:

upon receipt of downstream traffic signals having a single wavelength, transmitting the downstream optical signals and outputting the same to the corresponding subscriber device by means of a first WDM optical filter, among a plurality of WDM optical filters arranged in a laminated manner at regular intervals and determining an interval between two neighboring photodiodes of a plurality of photodiodes depending on the intervals between the first WDM optical filter and the plurality of WDM optical filters and a slope of a WDM filter array;

upon receipt of upstream traffic optical signals having different wavelengths from at least one of a plurality of subscriber devices, reflecting the upstream traffic optical signals having different wavelengths and splitting the same by wavelength by means of the plurality of WDM optical filters; and converting the upstream traffic optical signals split by wavelength by the plurality of WDM optical filters into respective electrical signals by means of the plurality of photodiodes.

13. The method of claim 12, wherein the plurality of WDM optical filters are formed as a WDM filter array.

14. The method of claim 12, further comprising amplifying the electrical signals into digital signals.

15. The method of claim 12, further comprising converting downstream traffic electrical signals into the downstream optical signals and inputting the same into the first WDM optical filter.

16. The method of claim 12, wherein the splitting comprises transmitting and reflecting optical signals having given wavelengths depending on the optical reflection and transmission characteristics of each of the other WDM optical filters.

* * * * *